(12) United States Patent
Fanduzzi et al.

(10) Patent No.: US 10,446,952 B2
(45) Date of Patent: Oct. 15, 2019

(54) MOUNTABLE TERMINAL BLOCKS FOR CONTACTORS AND OPERATOR ELEMENTS

(71) Applicant: Eaton Corporation, Cleveland, OH (US)

(72) Inventors: Peter Joseph Fanduzzi, Kenosha, WI (US); Joseph Paul Uphaus, Whitefish Bay, WI (US); Thomas Francis Kurland, North Prairie, WI (US)

(73) Assignee: Eaton Intelligent Power Limited, Dublin (IE)

( * ) Notice: Subject to any disclaimer, the term of this patent is extended or adjusted under 35 U.S.C. 154(b) by 218 days.

(21) Appl. No.: 15/067,845

(22) Filed: Mar. 11, 2016

(65) Prior Publication Data

US 2017/0264029 A1 Sep. 14, 2017

(51) Int. Cl.
*H01R 9/24* (2006.01)
*H05K 5/02* (2006.01)
*H05K 5/00* (2006.01)
*H02B 1/32* (2006.01)

(52) U.S. Cl.
CPC .............. *H01R 9/24* (2013.01); *H02B 1/32* (2013.01)

(58) Field of Classification Search
CPC ... H01R 9/2416; H05K 5/0247; H05K 5/0069
USPC ........................................................ 361/752
See application file for complete search history.

(56) References Cited

U.S. PATENT DOCUMENTS

| | | | |
|---|---|---|---|
| 4,595,812 A * | 6/1986 | Tamaru | H01H 71/0228 200/307 |
| 5,090,922 A | 2/1992 | Rymer et al. | |
| 5,483,213 A * | 1/1996 | Mueller | H01H 71/08 335/132 |
| 6,262,497 B1 * | 7/2001 | Muroi | G04C 23/02 307/116 |
| 6,285,271 B1 * | 9/2001 | Bauer | H01H 50/543 335/132 |
| 6,781,491 B2 * | 8/2004 | Whipple | H01H 11/0031 335/202 |

(Continued)

FOREIGN PATENT DOCUMENTS

JP 2853949 B2 2/1999
JP 2011139630 A 7/2011

(Continued)

*Primary Examiner* — Jinhee J Lee
*Assistant Examiner* — Rockshana D Chowdhury
(74) *Attorney, Agent, or Firm* — Ziolkowski Patent Solutions Group, SC (57) ABSTRACT

A wire connection accessory is disclosed that includes a mounting structure formed thereon configured to mate with an existing mounting feature provided on a "host" electrical switching component or "host" operator switch present within an electrical enclosure/assembly is disclosed. The wire connection accessory comprises a component whose mechanical and electrical state does not change response to functioning of the host device to which it is mounted. The host electrical switching component or operator switch includes a first mounting feature formed on an external surface thereof so as to serve as a host device. The wire connection accessory includes a second mounting feature mateable with the first mounting feature to selectively affix the wire connection accessory to the host device.

19 Claims, 6 Drawing Sheets

(56) References Cited

U.S. PATENT DOCUMENTS

| | | | |
|---|---|---|---|
| 6,783,392 B1 * | 8/2004 | Torii | H01R 12/707 |
| | | | 439/404 |
| 7,798,868 B2 * | 9/2010 | Borona | H01R 4/305 |
| | | | 335/202 |
| 7,922,521 B1 | 4/2011 | Wu | |
| 7,980,891 B2 | 7/2011 | Molnar | |
| 7,980,902 B2 * | 7/2011 | Capaldi-Tallon | H01R 9/2608 |
| | | | 439/532 |
| 8,113,864 B2 * | 2/2012 | Chiang | H01R 13/4361 |
| | | | 439/347 |
| 8,737,043 B2 * | 5/2014 | Hughes | H01H 9/04 |
| | | | 361/673 |
| 9,125,317 B2 | 9/2015 | Kho et al. | |
| 2012/0071038 A1 * | 3/2012 | Ondusko | G01K 7/023 |
| | | | 439/884 |
| 2012/0103769 A1 * | 5/2012 | Jun | H01H 3/20 |
| | | | 200/293 |
| 2012/0190250 A1 * | 7/2012 | Patel | H02K 5/225 |
| | | | 439/709 |
| 2014/0199864 A1 | 7/2014 | Devanand et al. | |
| 2015/0016875 A1 | 1/2015 | Eminovic et al. | |
| 2015/0325397 A1 * | 11/2015 | Larcher | H01H 50/002 |
| | | | 335/187 |
| 2015/0372418 A1 * | 12/2015 | Richards | H01R 13/629 |
| | | | 439/536 |

FOREIGN PATENT DOCUMENTS

| | | | |
|---|---|---|---|
| JP | 2014191881 A | * | 10/2014 |
| KR | 101040179 B1 | | 6/2011 |

\* cited by examiner

MOUNTABLE TERMINAL BLOCKS FOR CONTACTORS AND OPERATOR ELEMENTS

BACKGROUND OF THE INVENTION

Embodiments of the invention relate generally to electrical wire connections and, more particularly, to wire terminal blocks and an associated mounting/installation mechanism for the addition of such terminal blocks to components of an electrical control system.

Electrical switching components are generally well known in the art and include, for example, circuit switching devices and circuit interrupters, such as circuit breakers, contactors, motor starters, motor controllers, operator switches and other load controllers. It is typical for such electrical switching components to include built-in physical features for the mounting of auxiliary devices or accessories thereto. These physical features are used with devices designed specifically to report or indicate information about the component they are attached to. For example, contactors have auxiliary contacts to report the status of the contactor (i.e., closed or open), operator elements have contacts that indicate the position or mode of the operator element, (i.e., left, center, or right), and circuit breakers or overloads have contacts that indicate if the device is closed, open, or tripped.

Typically, electrical control assemblies that use electrical switching components are contained within enclosures or mounted on panels that are effective to protect the electrical components from exposure to environmental conditions or to protect the operator. As an example, a contactor and motor starter may be housed in a common enclosure, with an operator switch also provided thereon. In such electrical control assemblies, it is common for one or more spare terminal blocks or other wire connection accessories to be included in the enclosures. With respect to such spare terminal blocks, such blocks are employed to provide needed isolated wire connection points for internal and external electrical wire connections as it is recognized that it may be necessary to provide isolated terminal blocks to land unterminated wires that are present within the enclosure—to meet safety requirements/regulations, etc.

For purposes of mounting such terminal blocks and other accessories within the enclosure, various rail structures or mechanical fasteners (i.e., screws, bolts) are often utilized. One such popular rail structure is based upon a standard set of flanged rails that can be cut to a desired length and attached via screws to the interior of an enclosure. The rails, commonly referred to as "DIN" rails, have either inwardly or outwardly projecting raised flanges along their length for receiving the terminal blocks/accessories thereon thereon, with the terminal blocks/accessories featuring corresponding structures designed to interface with the rail flanges to hold them securely in place to the enclosure or panel during installation and use.

With regard to the use of such DIN rails and the mounting of terminal blocks thereon, that there is a cost associated with the components and the labor necessary to secure each component to the enclosure or panel with the associated hardware. In addition, it is recognized that the installation of the DIN rails and securing of components thereto, in many cases, is required to be performed as an update or retrofit in the field after the assembly has been manufactured and installed. Because the assembly is no longer at the factory, the tools and methods needed (e.g., drilling holes, rewiring) to install this may not be easily accomplished at other locations.

In addition to the cost and expense in material and labor of affixing the DIN rail to the enclosure and installing the terminal blocks/accessories thereon, it is recognized that the inclusion of the DIN rail and mounting of components thereon consumes a large amount of space in the enclosure. That is, spacing within the enclosure is often at a premium, and the DIN rail and terminal blocks/accessories mounted thereon may take up valuable space within the enclosure or panel that would ideally be left free and/or prevent the use of a smaller enclosure or panel at a lower cost to provide the same function were the DIN rail not present. The lack of panel space or mounting locations for the addition of these components in the field is also a common problem.

It would therefore be desirable to provide for the additional electrical connection points/mounting of terminal blocks and other wire connection accessories within the enclosure in a fashion that does not require use of DIN rails or other mechanical fasteners, to minimize the labor and expense associated with installing these parts and affixing components thereto. It would also be desirable for the terminal blocks/accessories to be mounted in a manner and at locations that minimizes the amount of space within the enclosure or panel taken up thereby.

BRIEF DESCRIPTION OF THE INVENTION

Embodiments of the invention are directed to a wire connection accessory that includes a mounting structure formed thereon configured to mate with an existing mounting feature provided on a "host" electrical switching component or "host" operator switch present within an electrical enclosure/assembly. The host component serves only as a mounting location and is electrically and mechanically isolated from the attached wire connection accessory or point, with the existing mounting feature being provided in any of numerous locations on the host device.

In accordance with one aspect of the invention, an electrical system includes an electrical enclosure or panel and a control circuit positionable within or on the electrical enclosure or panel and operable to control power to or operation of a load associated with the control circuit, the control circuit comprising a first mounting feature formed on an external surface thereof so as to serve as a host device. The electrical system also includes a wire connection accessory comprising a second mounting feature mateable with the first mounting feature to selectively affix the wire connection accessory to the control circuit, wherein the wire connection accessory comprises a component whose mechanical and electrical state does not change response to functioning of the control circuit to which it is mounted.

In accordance with another aspect of the invention, a wire connection accessory mateable with an external control circuit includes a housing comprising a plurality of surfaces, the plurality of surfaces including a first surface and a second surface. The wire connection accessory also includes one or more wire connection points positioned on or accessible via the first surface of the housing to secure one or more wires thereto and a mounting feature provided on the second surface of the housing, the mounting feature constructed to selectively secure the wire connection accessory to the external control circuit and release the wire connection accessory from the external control circuit without the use of fasteners.

In accordance with yet another aspect of the invention, an electrical system includes a control circuit operable to control power to or operation of a load associated with the control circuit, the control circuit comprising a control circuit mounting feature formed thereon. The electrical system also includes a terminal block securable to the control circuit via the mounting feature thereof, the terminal block comprising a housing, one or more wire connection points positioned on or accessible via the housing to secure one or more wires thereto, and a terminal block mounting feature constructed to mate with the control circuit mounting feature of the control circuit so as to provide for securing of the terminal block to the control circuit. The terminal block is isolated from the control circuit such that functioning of the control circuit does not change the mechanical or electrical state of the terminal block.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the inventions are directed to a wire connection accessory that includes a mounting structure formed thereon configured to mate with an existing mounting feature provided on a "host" electrical control circuit present in or on an electrical enclosure or panel, such as an electrical switching assembly or operator switch. While the operating environment of the invention is described with respect to the mounting of such wire connection accessories to control circuits or control components of an electrical distribution system included within an electrical enclosure, one skilled in the art will appreciate that embodiments of the invention are not limited to systems that make use of or include such enclosures and are equally applicable for use with stand-alone control circuits or components that may not be included within such an enclosure.

Figure 1:
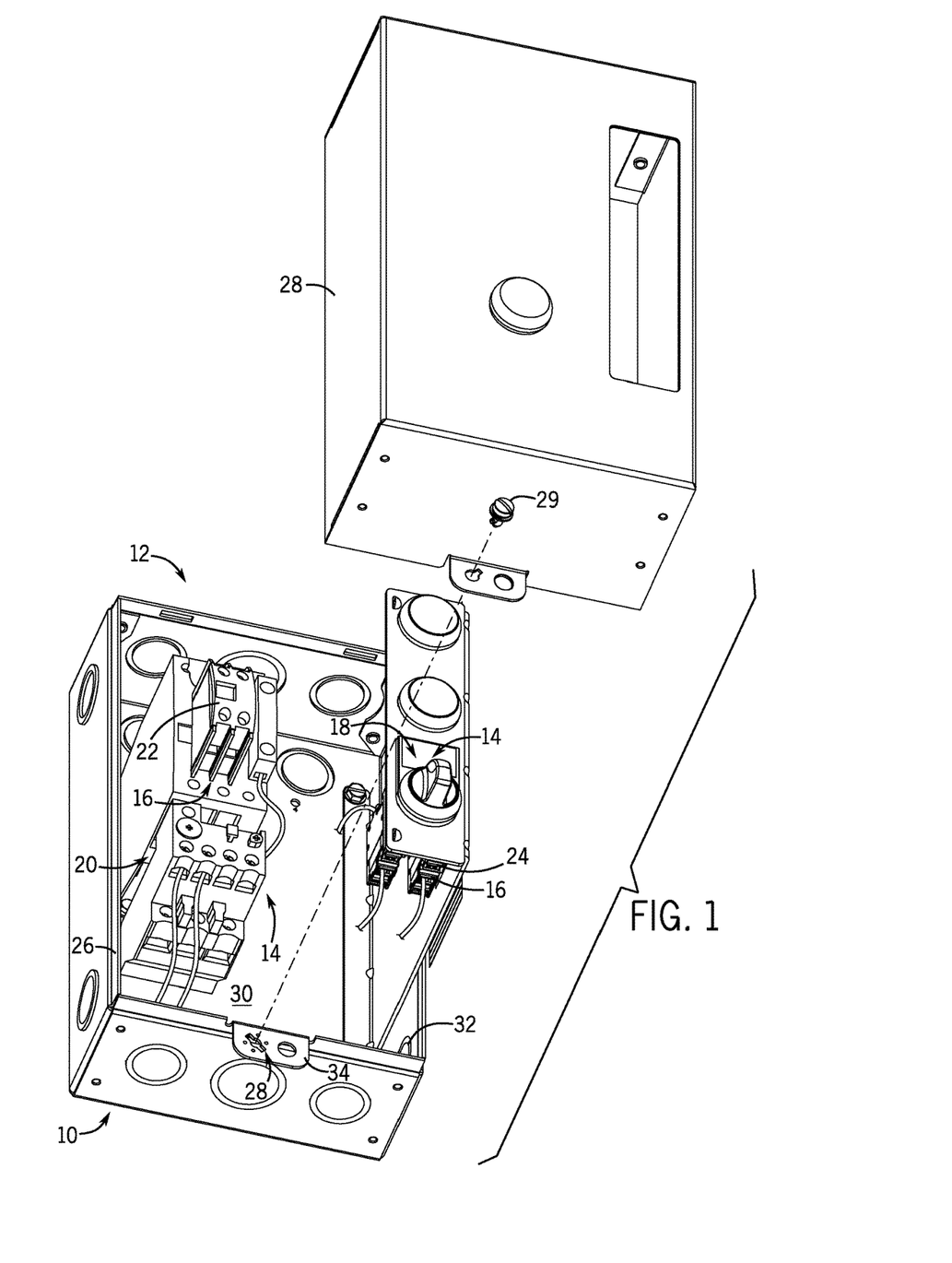
FIG. 1 is a perspective view of an electrical system that includes "host" devices to which terminal blocks and contact blocks may be mounted, according to an embodiment of the invention.

Referring now to FIG. 1, an electrical system 10 is illustrated according to an embodiment of the invention. The electrical system 10 includes an electrical enclosure 12 within which one or more control circuits or components 14 are positioned therein, as well as wire connection accessories 16 that are securable to the control circuits 14—such that the control circuits 14 serve as a "host" for the wire connection accessories. In the illustrated embodiment, the electrical system 10 is shown as including control circuits in the form of a host contactor/motor starter 20 and host rotary operator switch 18 and wire connection accessories in the form of terminal blocks 22 and contact blocks 24 coupled thereto, but it is to be recognized that control circuits 14 in the form of circuit breakers, pushbutton switches, etc., could instead or additionally be provided in electrical system 10, and that other types of wire connection accessories 16 could be mounted thereto instead of a terminal block.

As shown in FIG. 1, the electrical enclosure 12 of electrical system 10 includes an electrical box 26, an enclosure cover 28, and a locking provision 29 to lock the enclosure cover on the electrical box 26. The electrical box 26 is formed from a back panel 30 and a plurality of side panels 32, with the present embodiment illustrating control circuits/components 14 being affixed to the back panel 30, such as via screws or other appropriate fasteners. The electrical enclosure 12 may thus be a lockable enclosure that protects the electrical circuits/components 14 from environmental conditions and protect operators from electrical shock. According to one embodiment, the electrical enclosure 12 meets the standards for a NEMA Type 1 enclosure that houses control circuits therein for controlling/running low horsepower loads connected thereto.

As will be explained in greater detail below, according to embodiments of the invention, one or more of the control circuits 14 includes mounting features thereon that provide for attachment of a wire connection accessory 16 thereto. The wire connection accessory 16 includes corresponding mounting features thereon that mechanically couple with the mounting feature of its respective control circuit, with each wire connection accessory 16 being structured and attached such that its mechanical and electrical state does not change responsive to functioning of the control circuit 14 to which it is mounted—i.e., a "dummy" or spare accessory/block, with it being understood that the term "dummy" as used herein refers to the accessory/block not being part of the host function and/or having no interaction with the state or condition of the host the dummy accessory/block is attached to. The wire connection accessories 16 may be employed to provide needed isolated connection points for wiring in the electrical system 10, as it is recognized that it may be necessary to provide isolated connection points to land unterminated wires that are present within the enclosure 12. By mounting such wire connection accessories 16 directly on the control circuits 14 of electrical system 10, space within the enclosure 12 may be saved/maximized and the labor and expense associated with mounting the wire connection accessories 16 may be minimized, as compared to when wire connection accessories 16 are attached/installed to DIN rails or by other methods provided on the enclosure 12 or on the panel, as is commonly done in the art.

Figure 2:
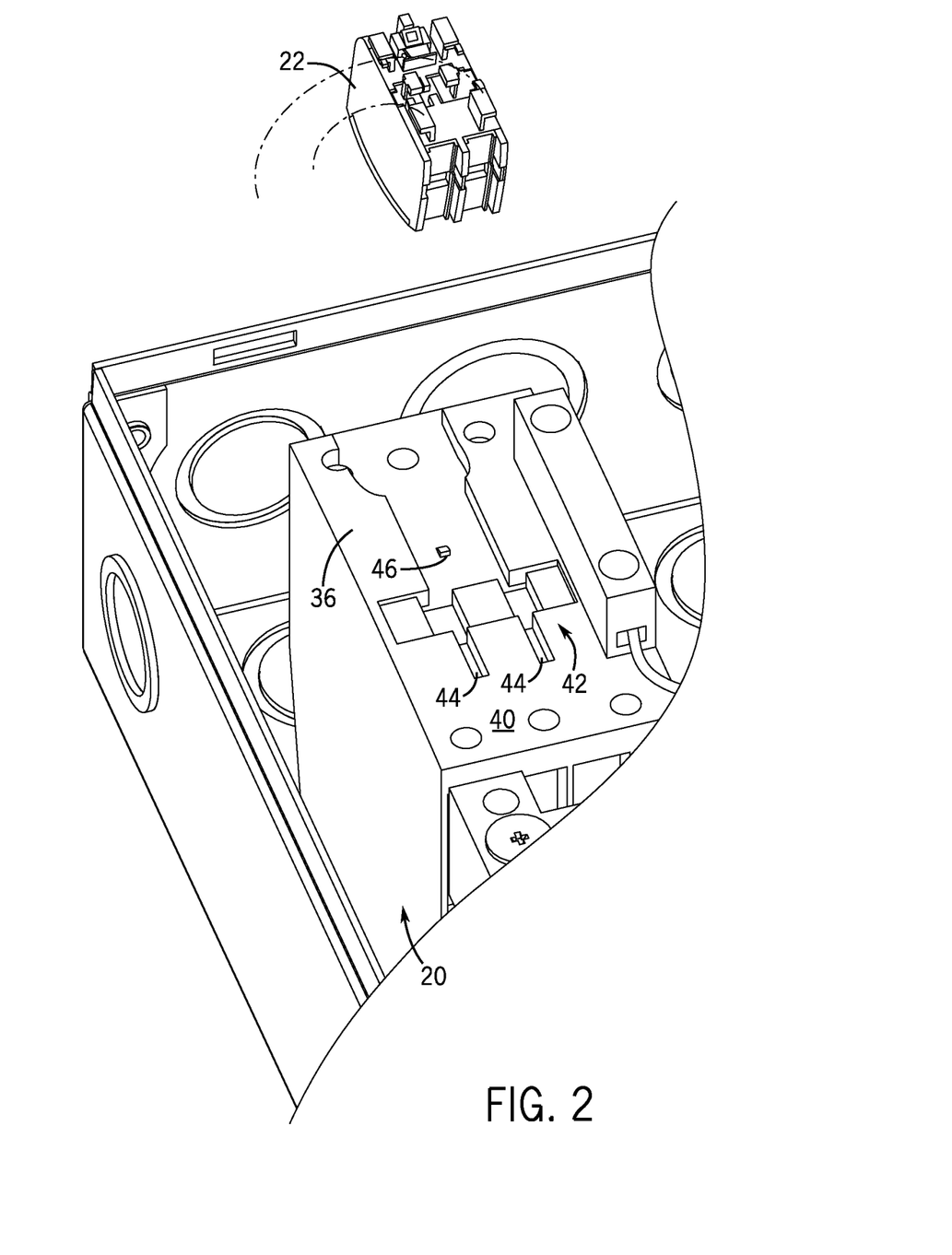
FIG. 2 is a perspective view of a contactor/motor starter host device and top contactor type terminal block included in the electrical system of FIG. 1, with the terminal block being mounted to the host contactor/motor starter via mounting features thereon, according to an embodiment of the invention.
Figure 4:
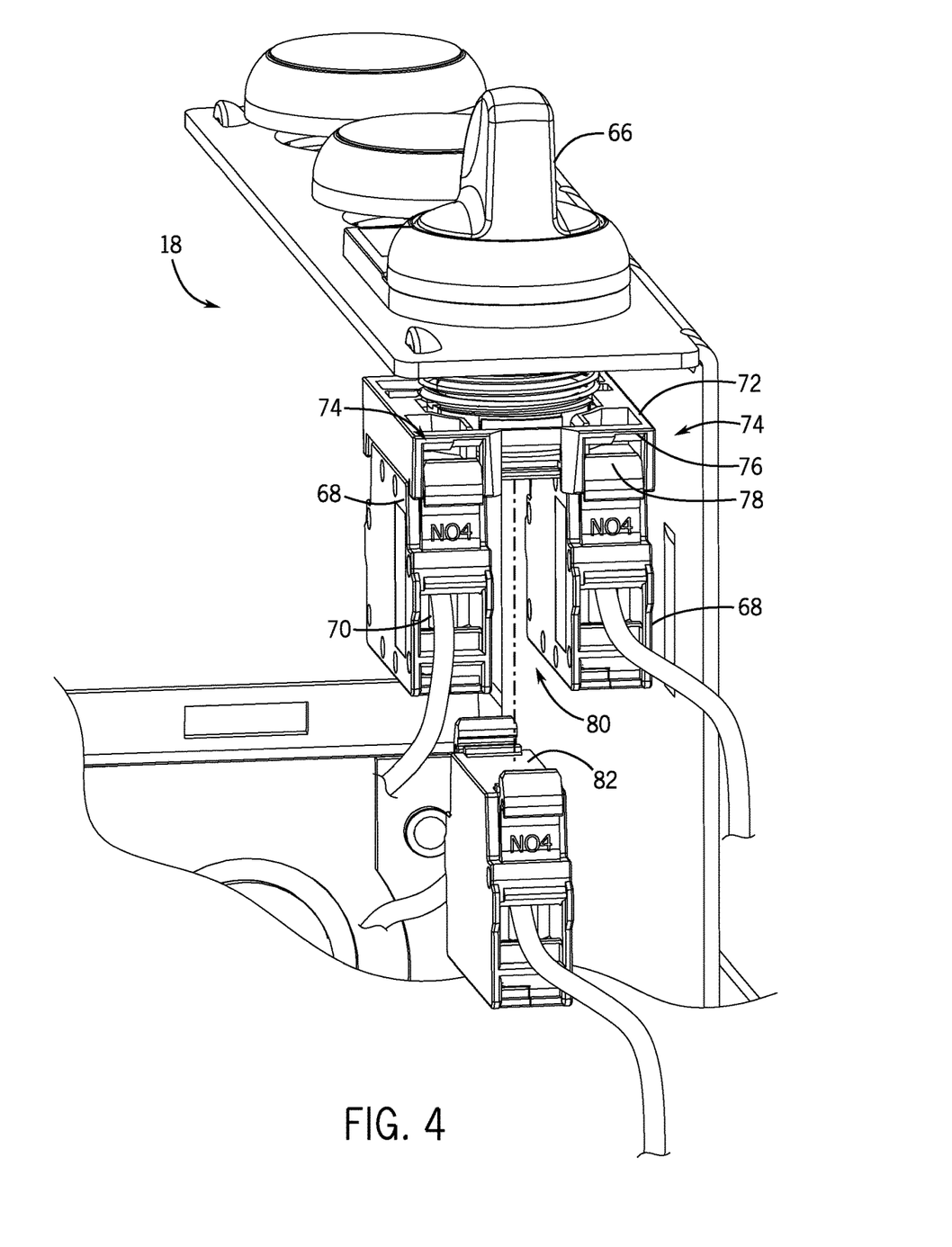
FIG. 4 is a perspective view of a host operator switch and operator type contact block included in the electrical system of FIG. 1, with the contact block being mounted to the operator switch via mounting features thereon, according to an embodiment of the invention.

As indicated above, in the embodiment illustrated in FIG. 1, the control circuits/components 14 in electrical system 10 include a contactor/motor starter 20 and a rotary style operator switch 18, which are illustrated in greater detail in FIGS. 2 and 4. Referring first to FIG. 2, in the embodiment depicted, contactor/motor starter 20 is a multi-phase motor starter as commonly used in industrial control applications, such as motor control. Contactor/motor starter 20 includes a contactor 36 and an overload relay 38. Contactor 36 is an electromagnetic contactor for switching supply current to a load (not shown). Overload relay 38 senses and measures the current to the load, and shuts off or de-energizes contactor 36 if too much current (overload) is flowing to the load, thus protecting the load.

As shown in FIG. 2, the host contactor 36 of contactor/motor starter 20 includes an outer housing 40 having a mounting feature 42 thereon (i.e., a "first mounting feature") that provides for securing thereto of an external component (e.g., auxiliary circuit, dummy terminal block, etc.). In one embodiment the mounting feature 42 is constructed as an arrangement of slots or openings 44 formed in the outer housing 40. The slots 44 are provided as a pair of slots arranged in parallel so as to function as a track along which terminal block 22 may be translated and slid into positioned to lock/secure the terminal block to the contactor 36. The mounting feature 42 of the contactor 36 also includes a ramped protrusion 46 thereon positioned along the track 44 that interacts with the terminal block 22 as part of the locking/securing process.

Figure 3:
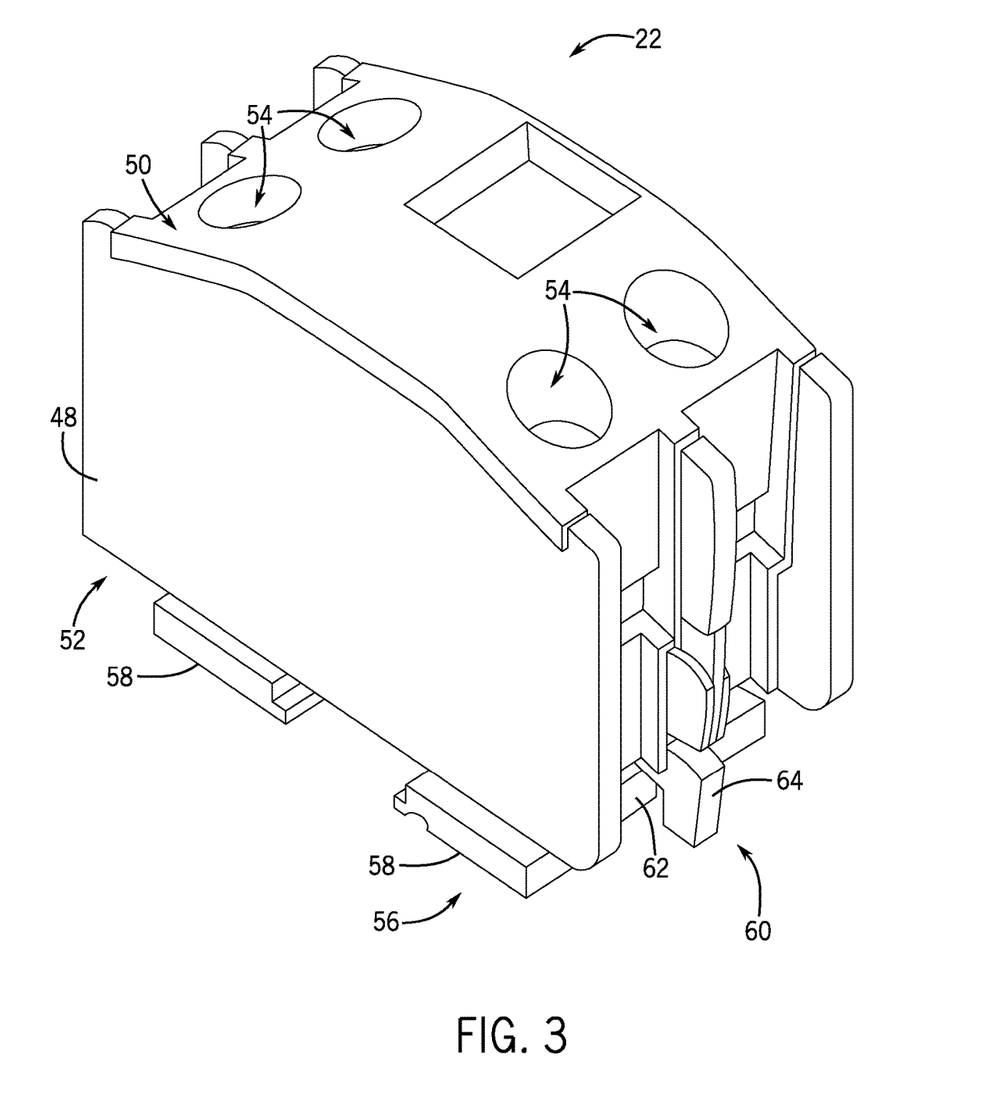
FIG. 3 is a perspective view of the terminal block showing features designed to mount to the host contactor/motor starter of FIG. 2, according to an embodiment of the invention.

As shown in FIG. 2, and additionally in FIG. 3, terminal block 22 mountable to contactor 36 includes a housing 48 having a plurality of surfaces—with a top surface 50 and bottom surface 52 being specifically identified in FIG. 3. A plurality of wire connection points 54 is provided on terminal block 22, which in the illustrated embodiment are positioned on and accessible via the top surface 50 of the housing 48 to provide for the securing of one or more wires thereto. In order to enable securing of the terminal block 22 to the contactor 36, a mounting feature (i.e., a "second mounting feature") 56 is provided on the bottom surface 52 of the terminal block housing 48. The terminal block mounting feature 56 is comprised of an arrangement of protrusions 58 extending outward from the bottom surface 52 and a latch mechanism 60 that is actuatable to selectively lock the terminal block 22 to the contactor 36 and release the terminal block 22 from the contactor 36. In the illustrated embodiment, the arrangement of protrusions 58 is composed of four protrusions spaced apart and aligned to enable engagement of the protrusions 58 with the slots 44 of the contactor housing 40. The protrusions 58 may be slid along the track formed by slots 44 to position the terminal block 22 in a locked position on the contactor 36. Upon reaching the locked position, a latch 62 of latch mechanism 60 interacts with the ramped protrusion 46 on contactor housing 40 to achieve locking of the terminal block 22 to the contactor 36. More specifically, as the terminal block 22 is translated along the slots 44 of housing 40, the latch 62 is caused to slide along and up ramped protrusion 46 until—upon reaching the end of ramped protrusion 46—the latch 62 snaps down to lock the terminal block 22 in place. A lever 64 on the latch mechanism 60 may then be depressed to disengage the latch 62 from the ramped protrusion 46, so as to unlock the terminal block 22 and allow it to be slid out from the mounting feature slots 44 of the contactor 36 as necessary. Accordingly, the terminal block 22 may be secured to the contactor 36 and released therefrom without the use of fasteners.

Referring now to FIG. 4, in the embodiment depicted, the host operator switch 18 is in the form of a rotary switch that includes a rotatable knob element 66 movable between three positions for controlling a supply of power to a load. The operator switch 18 also includes a pair of contact blocks 68 that interact with the rotatable knob 66 based on the rotational position thereof. Each of the contact blocks 68 is a single pole device with a pair of contact points (i.e., screw terminals thereon) 70 for connecting wiring thereto. In operation, actuation of the rotatable knob 66 controls movement/positioning of protrusions/features (not shown) on a backside of the rotatable knob element, with such protrusions interacting with the poles of the contact blocks 68 based on the knob position.

As seen in FIG. 4, a plate 72 is provided in host operator switch 18 that attaches to the backside of the rotatable knob element 66. The plate 72 functions as a mounting feature (i.e., "first mounting feature") to which the pair of contact blocks 68 may be secured, with a plurality of openings 74 being formed in the plate 72 and a flange-type feature 76 being present adjacent each opening 74 to enable mating of the contact blocks 68 to the plate 72. In an exemplary embodiment, the contact blocks 68 are mounted on the plate 72 via snap clips 78 on the contact blocks 68 that are received in the openings 74 of plate 72 and mate with the flanges 76 of the plate 72—with a combination of snap clips 78 on each end of the contact block 68 securing the contact block in place on the operator switch 18. The pair of contact blocks 68 are spaced apart on plate 72 such that operator switch 18 includes an open slot 80 on the rear surface between the two contact blocks 68.

Figure 5:
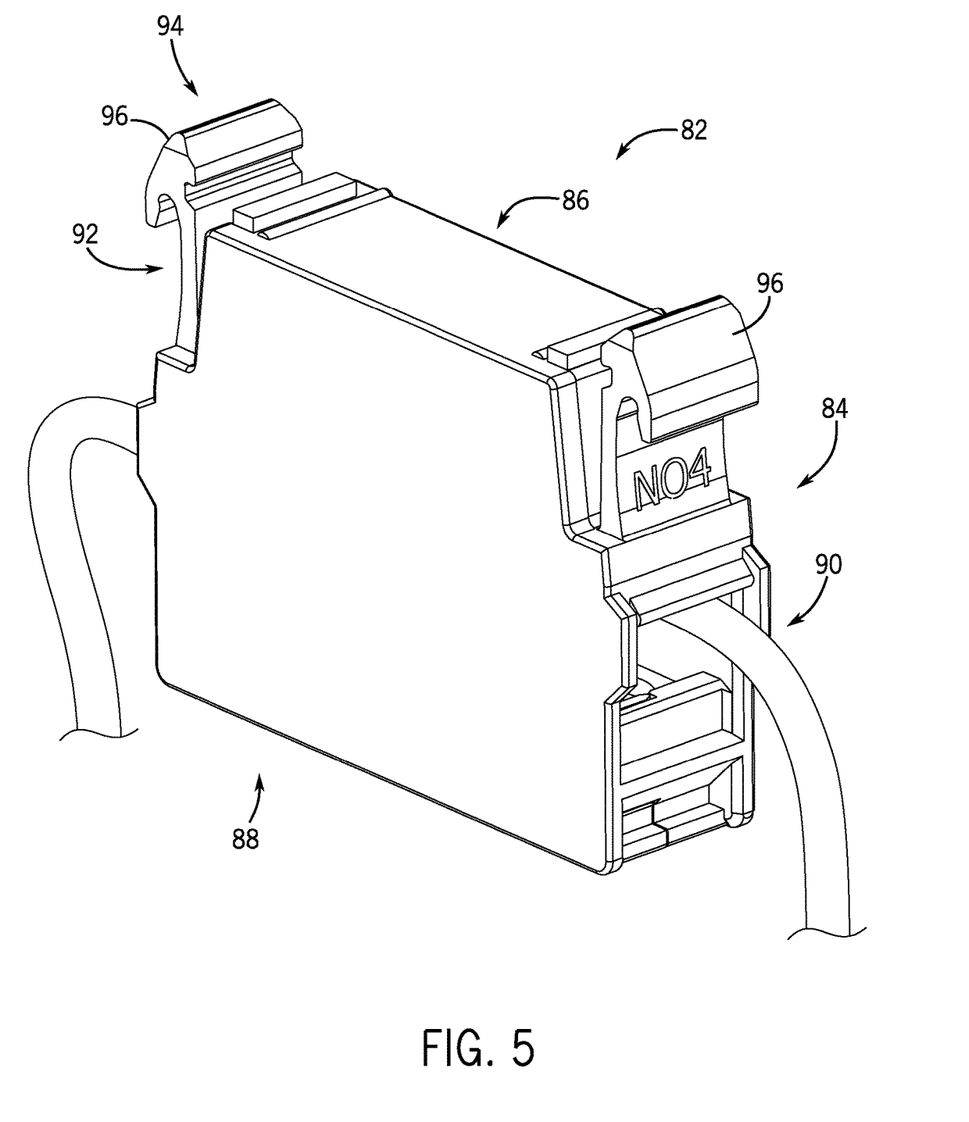
FIG. 5 is a perspective view of the operator type contact block showing the features designed to mount to the host operator switch of FIG. 4, according to an embodiment of the invention.

According to an embodiment of the invention, a dummy or spare contact block is provided and attached to operator switch 18 in the open slot 80 in order to provide additional isolated connection points for wiring in the electrical system 10. A construction of such a spare contact block 82 is illustrated in FIG. 5, with the spare contact block 82 including a housing 84 having a plurality of surfaces—with a top surface 86 and bottom surface 88 being specifically identified in FIGS. 4 and 5. A plurality of wire connection points (screw terminals) 90 is provided on spare contact block 82, which in the illustrated embodiment are positioned on and accessible via the bottom surface 88 and side surfaces 92 of the housing 84 to provide for the securing of one or more wires thereto. In order to enable securing of the spare contact block 82 to the operator switch 18, a mounting feature (i.e., a "second mounting feature") 94 is provided on the top surface 86 of the spare contact block housing 84. The spare contact block mounting feature 94 is comprised of snap clips 96 that are received in the openings 74 of plate 72 and mate with the flanges 76 of the plate 72—with a combination of snap clips 96 on each end of the spare contact block 82 securing spare the contact block 82 in place on the operator switch 18, similar to the active contact blocks 68 of the operator switch 18. It is recognized that the spare contact block 82 does not include a pole thereon or other feature that would interact with the operator switch 18 during operation thereof. That is, while movement/positioning of protrusions/features on a backside of the rotatable knob element 66 responsive to actuation thereof interacts with the poles of the contact blocks 68 based on the knob position, these protrusion/features do not interact with the spare contact block 82. Accordingly, the mechanical and electrical state of the spare contact block 82 does not change responsive to functioning of the operator switch 18 to which it is mounted, but instead the spare contact block 82 only serves to provide isolated connection points for wiring in the electrical system 10—such as to land unterminated wires that are present within the enclosure.

Figure 6:
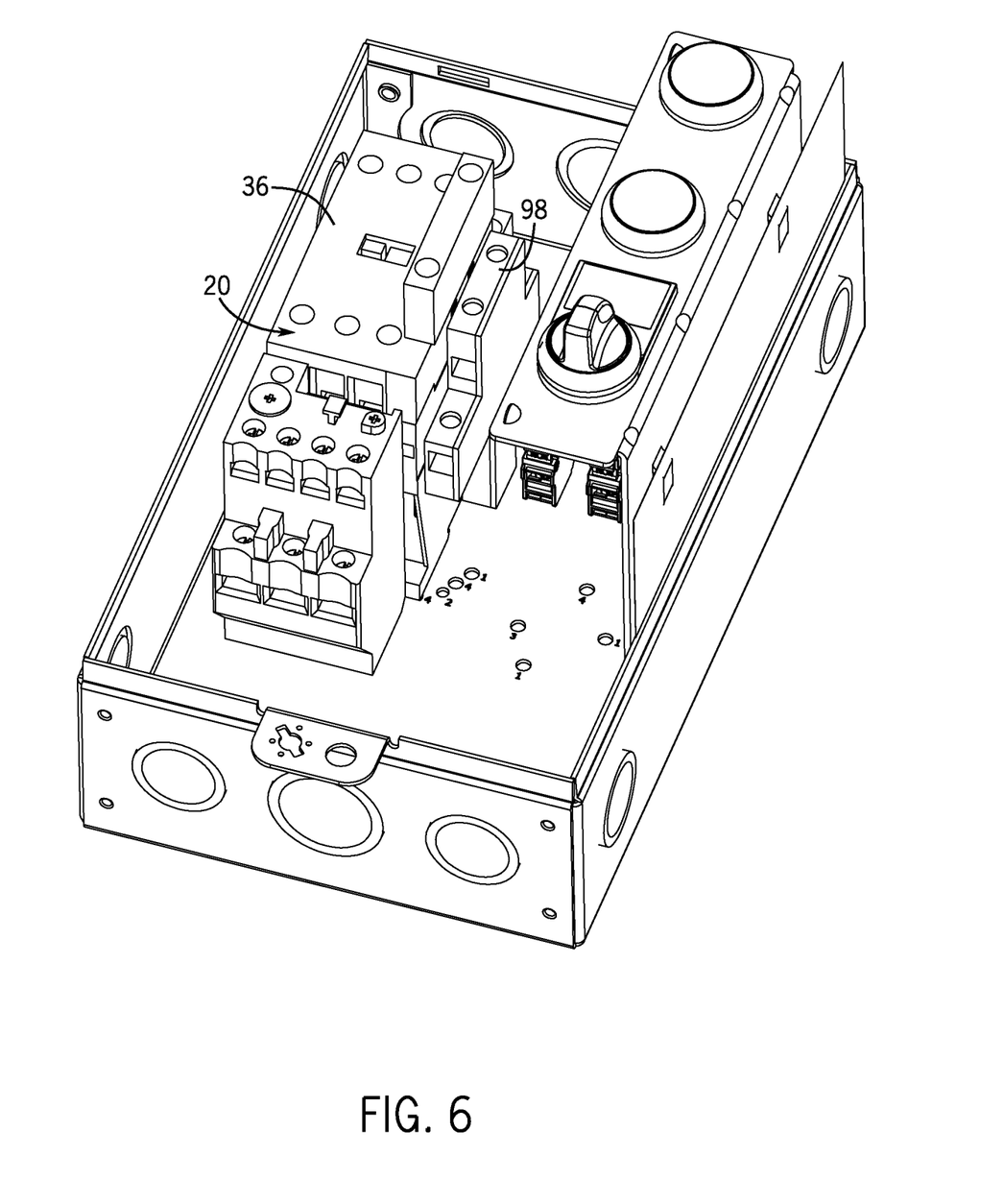
FIG. 6 is a perspective view of a side type contactor terminal block mounted on a side of the host contactor/motor starter included in the electrical system of FIG. 1, according to another embodiment of the invention.

While embodiments of the invention are described in detail above with respect to a specific terminal block construction for mating with a specific mating feature of a contactor/motor starter and a specific contact block construction for mating with a specific mating feature of an operator switch, it is recognized that the scope of the invention is not meant to be limited to such constructions. That is, additional embodiments of the invention may be directed to terminal blocks/contact blocks having alternative constructions that would mate with other mounting features on the illustrated contactor/motor starter and operator switch, and additional embodiments of the invention may also be directed to wire connection accessories mountable to other forms of protection and control circuits—including circuit breakers, contactors and products of other types from any manufacturer and operator elements of other types (e.g., pushbutton switches, rocker switches, lights, 22 mm, 30 mm, etc.) from any manufacturer. As one example of an additional embodiment of the invention, illustrated in FIG. 6, a terminal block 98 having an alternative construction is securable to the contactor/motor starter 20 via a mounting feature provided on a side surface of the housing of the host contactor 36—with such a mounting feature again being in the form of openings or slots that mate with a mounting feature of the terminal block 98.

Beneficially, embodiments of the invention thus provide wire connection accessories that are mountable on control circuits of an electrical system utilizing mounting features on the wire connection accessories and existing mounting features on the control circuits. The wire connection accessories are structured and attached such that their mechanical and electrical state does not change responsive to functioning of the control circuit to which it is mounted—such that the wire connection accessories are provided as "dummy" or spare terminal or contact blocks. The wire connection accessories may be employed to provide needed isolated connection points for wiring in the electrical system to land unterminated wires that are present in the electrical system. By mounting such wire connection accessories directly on the control circuits of the electrical system, space within an enclosure of the system may be saved/maximized and the labor and expense associated with mounting the wire connection accessories may be minimized, as compared to when wire connection accessories are attached/installed to DIN rails or mechanical fasteners provided on the enclosure, as is commonly done in the art According to one embodiment of the invention, an electrical system includes an electrical enclosure or panel and a control circuit positionable within or on the electrical enclosure or panel and operable to control power to or operation of a load associated with the control circuit, the control circuit comprising a first mounting feature formed on an external surface thereof so as to serve as a host device. The electrical system also includes a wire connection accessory comprising a second mounting feature mateable with the first mounting feature to selectively affix the wire connection accessory to the control circuit, wherein the wire connection accessory comprises a component whose mechanical and electrical state does not change response to functioning of the control circuit to which it is mounted.

According to another embodiment of the invention, a wire connection accessory mateable with an external control circuit includes a housing comprising a plurality of surfaces, the plurality of surfaces including a first surface and a second surface. The wire connection accessory also includes one or more wire connection points positioned on or accessible via the first surface of the housing to secure one or more wires thereto and a mounting feature provided on the second surface of the housing, the mounting feature constructed to selectively secure the wire connection accessory to the external control circuit and release the wire connection accessory from the external control circuit without the use of fasteners.

According to yet another embodiment of the invention, an electrical system includes a control circuit operable to control power to or operation of a load associated with the control circuit, the control circuit comprising a control circuit mounting feature formed thereon. The electrical system also includes a terminal block securable to the control circuit via the mounting feature thereof, the terminal block comprising a housing, one or more wire connection points positioned on or accessible via the housing to secure one or more wires thereto, and a terminal block mounting feature constructed to mate with the control circuit mounting feature of the control circuit so as to provide for securing of the terminal block to the control circuit. The terminal block is isolated from the control circuit such that functioning of the control circuit does not change the mechanical or electrical state of the terminal block.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical system comprising:
an electrical enclosure or panel;
a control circuit positionable within or on the electrical enclosure or panel and operable to control power to or operation of a load associated with the control circuit, the control circuit comprising a first mounting feature formed on an external surface thereof so as to serve as a host device; and
a wire connection accessory comprising a second mounting feature mateable with the first mounting feature to selectively affix the wire connection accessory to the control circuit;
wherein the wire connection accessory comprises a terminal block constructed such that a mechanical and electrical state thereof does not change in response to functioning of the control circuit to which the terminal block is mounted.

2. The electrical system of claim 1 wherein the first mounting feature comprises an arrangement of slots or openings formed in an outer housing of the control circuit, and wherein the second mounting feature comprises an arrangement of protrusions that engage the arrangement of slots or openings via a sliding and/or snapping action to the secure the wire connection accessory to the control circuit.

3. The electrical system of claim 2 wherein the second mounting feature further comprises a latch that is actuatable to selectively lock the wire connection accessory to the control circuit and release the wire connection accessory from the control circuit.

4. The electrical system of claim 2 wherein the control circuit is a contactor.

5. The electrical system of claim 2 wherein the control circuit is a circuit breaker.

6. The electrical system of claim 2 wherein the control circuit is a motor starter.

7. The electrical system of claim 1 wherein the control circuit comprises an operator switch with a contact block.

8. The electrical system of claim 7 wherein the first mounting feature comprises a spare slot within the contact block, and wherein the wire connection accessory fits within the spare slot of the contact block so as to provide for mounting of the wire connection accessory with the contact block.

9. The electrical system of claim 1 wherein the terminal block having contacts thereon to provide for fastening of wires thereto.

10. The electrical system of claim 9 wherein the terminal block provides isolated connection points for wiring within the enclosure or on the panel.

11. A wire connection accessory mateable with an external control circuit, the wire connection accessory comprising:
- a housing comprising a plurality of surfaces, the plurality of surfaces including a first surface and a second surface;
- one or more wire connection points positioned on or accessible via the first surface of the housing to secure one or more wires thereto; and
- a mounting feature provided on the second surface of the housing, the mounting feature constructed to selectively secure the wire connection accessory to the external control circuit and release the wire connection accessory from the external control circuit without the use of fasteners;
- wherein the wire connection accessory comprises a terminal block constructed such that a mechanical and electrical state thereof does not change in response to functioning of the control circuit to which the terminal block is mounted.

12. The wire connection accessory of claim 11 wherein the mounting feature comprises an arrangement of protrusions extending outward from the second surface, the arrangement of protrusions constructed to slidingly engage an arrangement of slots or openings on the control circuit to the secure the wire connection accessory to the external control circuit.

13. The wire connection accessory of claim 11 wherein the mounting feature further comprises a latch actuatable to selectively secure the wire connection accessory to the control circuit and release the wire connection accessory from the control circuit.

14. The wire connection accessory of claim 11 wherein the terminal block provides isolated connection points for the one or more wires.

15. An electrical system comprising:
- a control circuit operable to control power to or operation of a load associated with the control circuit, the control circuit comprising a control circuit mounting feature formed thereon; and
- a terminal block securable to the control circuit via the control circuit mounting feature thereof, the terminal block comprising:
  - a housing;
  - one or more wire connection points positioned on or accessible via the housing to secure one or more wires thereto; and
  - a terminal block mounting feature constructed to mate with the control circuit mounting feature of the control circuit so as to provide for securing of the terminal block to the control circuit;
- wherein the terminal block is isolated from the control circuit such that functioning of the control circuit does not change the mechanical and electrical state of the terminal block.

16. The electrical system of claim 15 wherein the control circuit mounting feature comprises an arrangement of slots or openings formed in an outer housing of the control circuit, and wherein the terminal block mounting feature comprises an arrangement of protrusions that engage the arrangement of slots or openings via a sliding and/or snapping action to the secure the terminal block to the control circuit.

17. The electrical system of claim 16 wherein the terminal block mounting feature further comprises a latch that is actuatable to selectively lock the terminal block to the control circuit and release the terminal block from the control circuit.

18. The electrical system of claim 15 wherein the control circuit comprises one of a contactor, a circuit breaker, a starter, and an operator switch with a contact block.

19. The electrical system of claim 15 further comprising an electrical enclosure that houses the control circuit and to which the control circuit is mounted, the electrical enclosure comprising a NEMA Type 1 enclosure.

* * * * *